(12) United States Patent
Dixon

(10) Patent No.: US 11,605,138 B2
(45) Date of Patent: Mar. 14, 2023

(54) DATA RECONCILIATION FOR DISPARATE DATABASES BY AUTOMATIC GENERATION OF RELEVANT ACTION ITEMS

(71) Applicant: Sehlke Consulting, LLC, Arlington, VA (US)

(72) Inventor: Jason M. Dixon, Hampstead, NC (US)

(73) Assignee: Sehlke Consulting, LLC, Arlington, VA (US)

(*) Notice: Subject to any disclaimer, the term of this patent is extended or adjusted under 35 U.S.C. 154(b) by 0 days.

(21) Appl. No.: 17/163,178

(22) Filed: Jan. 29, 2021

(65) Prior Publication Data
US 2022/0245732 A1   Aug. 4, 2022

(51) Int. Cl.
| | |
|---|---|
| *G06Q 40/00* | (2012.01) |
| *G06F 16/2457* | (2019.01) |
| *G06F 16/27* | (2019.01) |
| *G06F 16/248* | (2019.01) |
| *G06F 16/25* | (2019.01) |
| *G06Q 40/12* | (2023.01) |

(52) U.S. Cl.
CPC ........... *G06Q 40/12* (2013.12); *G06F 16/248* (2019.01); *G06F 16/24575* (2019.01); *G06F 16/258* (2019.01); *G06F 16/27* (2019.01)

(58) Field of Classification Search
CPC ... G06Q 40/12; G06F 16/27; G06F 16/24575; G06F 16/258; G06F 16/248; G06F 16/273; G06F 16/275; G06F 16/278; G06F 16/1794

USPC .......................................................... 707/769
See application file for complete search history.

(56) References Cited

U.S. PATENT DOCUMENTS

| | | | | |
|---|---|---|---|---|
| 7,707,490 | B2 * | 4/2010 | Hays ..................... | G06F 16/248 715/234 |
| 8,428,332 | B1 * | 4/2013 | Csulits ................. | G06Q 20/108 382/135 |
| 8,433,123 | B1 * | 4/2013 | Csulits ................. | G06Q 20/108 382/135 |
| 8,437,530 | B1 * | 5/2013 | Mennie ............... | G06Q 30/0185 382/135 |
| 10,210,051 | B2 * | 2/2019 | Vallabhaneni .......... | G06F 3/067 |
| 10,839,352 | B1 * | 11/2020 | Mitchell ................ | G16H 10/60 |
| 2004/0181524 | A1 * | 9/2004 | Jardin ..................... | G06F 16/27 |
| 2013/0254075 | A1 * | 9/2013 | Ballaro .............. | G06Q 30/0601 705/27.1 |
| 2021/0319005 | A1 * | 10/2021 | Mire .................. | G06F 16/24534 |
| 2021/0319028 | A1 * | 10/2021 | Mire .................... | G06F 16/2423 |

* cited by examiner

*Primary Examiner* — Dung K Chau
(74) *Attorney, Agent, or Firm* — Womble Bond Dickinson (US) LLP

(57) ABSTRACT

A method includes retrieving files associated with a first database and one or more files associated with a second database. The method further includes merging and filtering the files of the first database into a merged file including action items from the files. The method further includes identifying action items from the merged file that match an item of the one or more files of the second database and generating an output file comprising an action description to be performed on the first database to reconcile the first database with the second database.

18 Claims, 9 Drawing Sheets

FIG. 7

DATA RECONCILIATION FOR DISPARATE DATABASES BY AUTOMATIC GENERATION OF RELEVANT ACTION ITEMS

STATEMENT REGARDING FEDERALLY SPONSORED RESEARCH OR DEVELOPMENT

This invention was made with Government support under contract No. 47QFLA20D0004 awarded by the United States General Services Administration. The Government has certain rights in the invention.

TECHNICAL FIELD

Aspects of the present disclosure relate to data management across databases, and more particularly, to reconciliation of data across disparate databases by automatically generating relevant action items to be performed.

BACKGROUND

The military standard requisitioning and issue procedures (MILSTIP) process is a process used by a customer to requisition items for their respective organizations for immediate consumption or re-stocking the shelf for issue to the organization when needed. These items are consumables. The MILSTRIP process includes the tasks of ordering (requisitioning), supplying the status of the order, shipping status of the item, receiving and accepting, acknowledging the receipt of the requisition of the item(s), returning the item, receiving the bill for the item, and paying the bill.

In the Defense Logistics Agency (DLA), and other systems or databases, when transactions from the logistics/supply system are not interfaced with the accounting system, the financial community must rely on the logistics community to initiate a request to adjust the accounting records based upon the information received by the supply system in the form of a status transaction. This process may not take place in a timely manner and could adversely affect financial reporting. At a minimum, supply and financial clerks should reconcile an Unliquidated Orders (ULO) report from the organizations supply system and a Due and Status File (DASF) from the organizations accounting system monthly before financial reporting occurs, to ensure that all requisitions are properly recorded in the accounting system. It is important that status transactions that may have a financial impact are properly recorded and the accounting system reflects the most current financial impact of the requisition.

SUMMARY

The present disclosure describes examples of systems and methods for data reconciliation for disparate databases by automatic generation of relevant action items.

A method includes retrieving a plurality of files associated with a first database and retrieving one or more files associated with a second database. The method further includes merging and filtering the files of the first database into a merged file comprising action items from those files. The method also includes identifying action items from the merged file that match an item of the one or more files of the second database and generating an output file comprising an action description to be performed on the first database to reconcile the first database with the second database.

A system includes a memory and a processing device operatively coupled to the memory. The processing device retrieves a plurality of files associated with a first database and retrieves one or more files associated with a second database. The processing device further merges and filters the files of the first database into a merged file comprising action items from those files. The processing device then identifies action items from the merged file that match an item of the one or more files of the second database and generates an output file comprising an action description to be performed on the first database to reconcile the first database with the second database.

A non-transitory computer-readable storage medium includes instructions that, when executed by a processing device, cause the processing device to retrieve files associated with a first database and retrieve one or more files associated with a second database. The processing device may further merge and filter, by the processing device, the files of the first database into a merged file comprising action items from those files. The processing device then identifies action items from the merged file that match an item of the one or more files of the second database and generates an output file comprising an action description to be performed on the first database to reconcile the first database with the second database.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 7 is a diagram illustrating an interface of input files to perform data reconciliation between accounting and supply systems in accordance with some embodiments.

DETAILED DESCRIPTION

Figure 1:
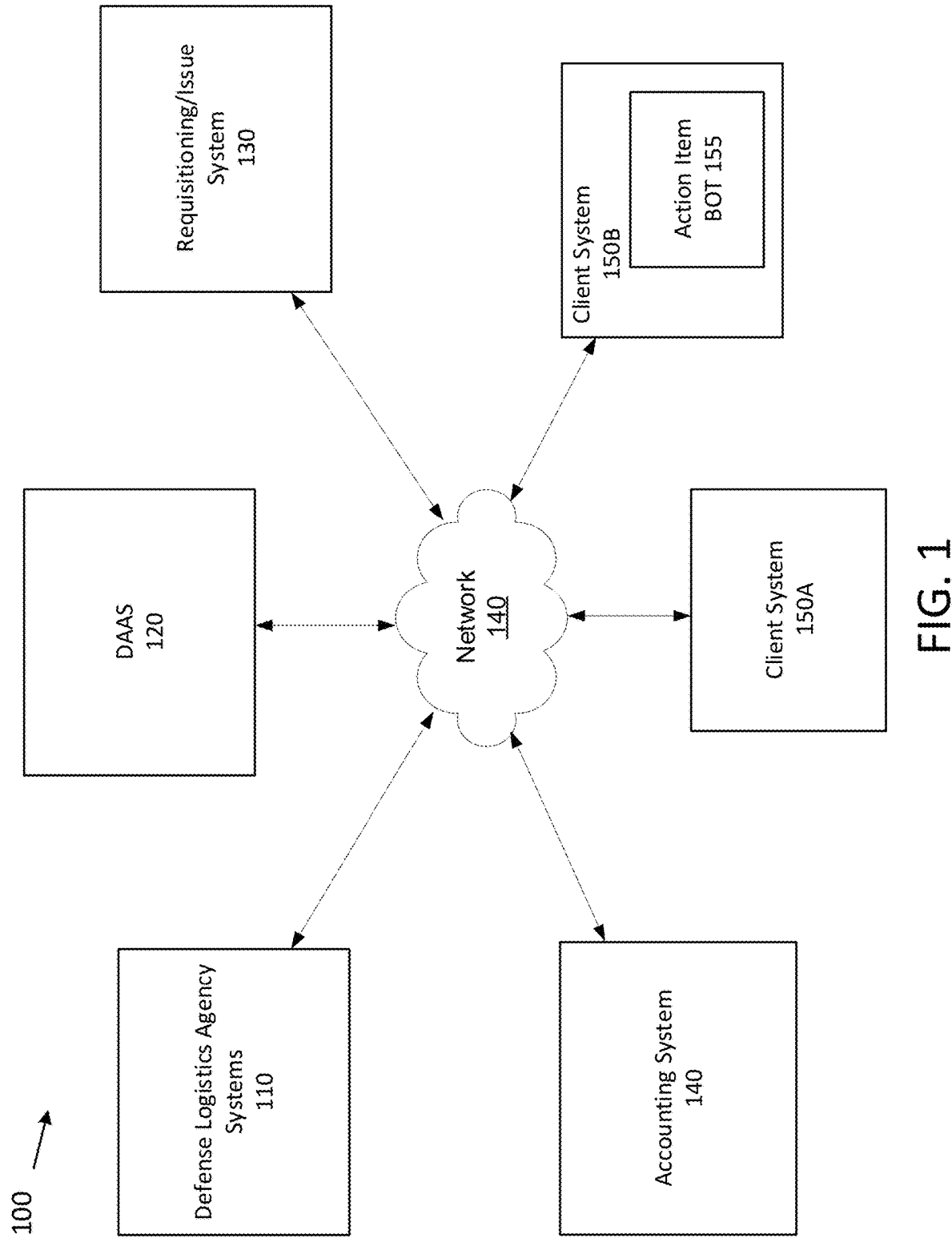
FIG. 1 is a system diagram that illustrates an example system to perform data reconciliation between disparate databases, in accordance with some embodiments.

Aspects of the disclosure address the above-noted and other deficiencies by providing automated reconciliation of accounting system data with Unliquidated Orders (ULO) data. The present disclosure provides an action item robot (BOT) to address the above, and other issues, with conventional systems.

The supply and logistics conversation is categorized by a three-digit code called the document identifier code. The document identifier code (DIC) provides means for identifying a transaction as to the system to which it pertains and further identifies such transaction as to its intended purpose and usage. The first character of the DIC identifies the type of system (i.e., alphabetic character A has been assigned to the supply distribution system(s) for requisitioning and issue). For example, DIC A01 is a requisition transaction from the customer to the Issue Control Point (ICP), and a DIC AE1 indicates it is a supply status transaction from the ICP to the requisitioner.

The action item BOT of the present embodiment may select supply status transactions (e.g., a DIC of AE_). The supply status transactions are initiated from the ICP in response to a customer request for status or to notify the customer of a change that impacts the requisition submitted by the customer. These status transactions sometimes require that the logistics community notify the financial community of adjustments that must be made to the accounting records pertaining to the original requisition submitted by the logistics community. These status transactions may inform the customer of the cancellation of the submitted requisition, price changes for the product ordered, estimated shipping date of the items, requisitions that were passed to another organization for fulfillment of the requisitioned item, and other relevant supply status notifications.

The action item BOT matches and identifies possible adjustments that may be required to update the accounting system with the most recent transaction status information that may impact the financial records. To maintain the separation of duties, the logistics clerk must initiate the request to update the financial records and to support the request with documentation, such as the electronic representation of the status transaction which requires a financial adjustment.

An action item BOT outcome report identifies those supply status transactions that have changed (i.e., requisitions) and identifies recommended actions that the supply clerk may initiate. The supply clerk should review the entire history of the identified requisition and determine what the proper course of action is and initiate the request for the financial clerk to record the requested adjustment to the accounting records.

Advantages of the present disclosure for automating the process of reconciling the accounting data with ULO data include significant savings of man hours, reduced errors, and increased accuracy of accounting data. For example, manual review of the records by a supply clerk to identify actionable items that would typically require 3 to 4 hours to perform may be performed in less than 2 minutes using the methods disclosed herein. The process may be performed daily, weekly, etc., which may result in a savings of many man hours weekly. Additionally, the number of mistakes due to human error in the accounting may be minimized because the required knowledge of the system status codes and corresponding actions in view to be taken in view of the status codes are extensive. Accordingly, the present disclosure provides substantial improvements over the current processes.

The practical applications and improvements to the field of database management of the present disclosure include selecting particular files and data from disparate systems that are to be reconciled and automatically reconciling the data of the disparate systems by determining what actions need to be taken. For example, the methods herein substantially increase the efficiency and accuracy of reconciling accounting data with logistics data or data between any two databases. Accordingly, the present disclosure improves the current technology of data management, database management, and systems management, among other fields of technology.

FIG. 1 is system 100 for data reconciliation across systems. System 100 includes a defense logistics agency system 110, a DAAS system 120, a requisitioning/issue system 130, an accounting system 140, and client systems 150A-B all coupled to a network 106. Network 106 may be any type of network such as a public network (e.g., the Internet), a private network (e.g., a local area network (LAN), Wi-Fi, or a wide area network (WAN)), or a combination thereof. Client system 150A may further include an action item BOT 155. Client devices 150A-B may each be any data processing device, such as a desktop computer, a laptop computer, a mainframe computer, a personal digital assistant, a rack-mount server, a hand-held device or any other device configured to process data. Defense logistics agency system 110, a DAAS system 120, a requisitioning/issue system 130 and accounting system 140 may be any type of server, such as an application server, a web server, an FTP server, or any other type of server with which a user device can communicate.

The accounting of the MILSTRIP transactions may be managed by the several systems depicted in FIG. 1. The requisition/issue system 130 may provide a requisition to the DAAS system 120 which may forward the requisition to the defense logistics agency systems 110. The requisitioning/issue system 130 may provide the requisition to the accounting system 140 to be recorded as an obligation. Any changes or updates to the requisition order or the status of the requisition may be provided to the defense logistics agency system 110 (e.g., entry of changes by a user of a client device, such as client devices 150A-B). For example, if a cancellation of the requisition occurs or if the catalog price changes then a change in status code may be entered into the defense logistics agency system 110 after which the changes may be provided to the DAAS system 120. The DAAS system 120 may then provide the status changes to the requisitioning/issue system 130.

For some embodiments, client system 150A may interface with the accounting system 140 for online data entry. For example, a financial clerk may use client system 150A to enter accounting information, such as accounting adjustments from requisitions, requisition order updates, cancellation, etc. into the accounting system 140. Client system 150B may interface with the requisitioning/issue system 130, for example to retrieve requisition status information. For example, a supply clerk may initiate an online query of the requisitioning/issue system 140 to obtain one or more files which may include status, cost, and supply information of pending requisitions. The supply clerk operating client device 150B may then forward notifications of accounting adjustments as determined from review of the obtained files.

For some embodiments, the client system 150B may include an action item BOT 155 to automatically generate action items to be provided to, for example, the financial clerk operating the client device 150A to update the accounting information at the accounting system 140. For example, the action item BOT 155 may retrieve several DASF files and a ULO file. The action item BOT 155 may consolidate the DASF files into a results DASF file by filtering and merging the DASF files to only records that include actionable status codes. The action item BOT may then identify records in the ULO file that have an SDN (standard document number) that matches a record of the results DASF file and write those matching records to a BOT output file. Finally, the action item BOT 155 may update an action description for each of the records in the BOT output file based on the status code of the corresponding record and may further calculate a possible accounting adjustment. The action item BOT 155 may then provide the BOT output file to specified users, such as a financial clerk using client device 150A for entry of accounting adjustments into the accounting system 140.

Figure 2:
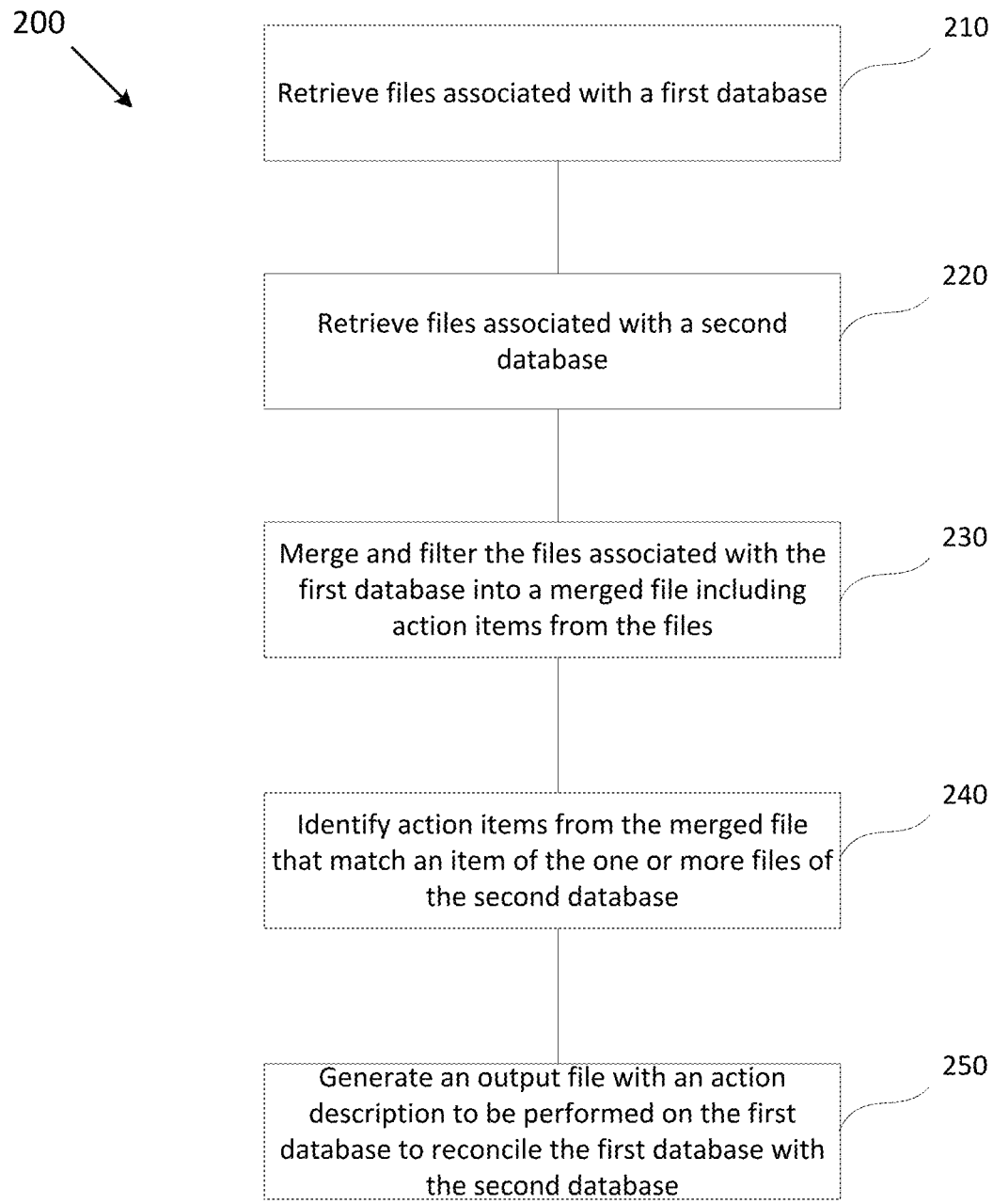
FIG. 2 is a flow diagram of an example method of data reconciliation between disparate databases, in accordance with embodiments of the disclosure.

FIG. 2 is a flow diagram of a method 200 of reconciling data across disparate databases. Method 200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 200 may be performed by action item BOT 155 of FIG. 1.

With reference to FIG. 2, method 200 illustrates example functions used by various embodiments. Although specific function blocks ("blocks") are disclosed in method 200, such blocks are examples. That is, embodiments are well suited to performing various other blocks or variations of the blocks recited in method 200. That the blocks in method 300 may be performed in an order different than presented, and not all of the blocks in method 300 may be performed.

Method 200 begins at block 210, where the processing logic retrieves files associated with a first database. For example, the first database may be a DASF database of an accounting system. The files associated with the first database may be DASF files including one or more records from the accounting system. The first database may be located at an accounting system for tracking accounting of requisition orders, payments, etc. For one embodiment, the processing logic may sort the records from the files of the first database (e.g., the DASF files) into an order based on the date on the transaction. For example, the processing logic may sort the DASF file records by the most recent transactions. Additionally, the processing logic may convert the DASF files into a digestible format, such as comma separated value (CSV) format from whatever format it is retrieved.

At block 220, the processing logic retrieves files associated with a second database. The second database may be a supply database including unliquidated order (ULO) records with a status for each record. The first and second databases may be co-located at the same system or located at separate systems.

At block 230, the processing logic merges and filters the files associated with the first database into a merged file including action items from the files. The processing logic may filter the DASF files based on the status code. For example, the processing logic may only copy records of the DASF files that include actionable status codes. Additionally, the processing logic may only copy records of the DASF file that includes a document identifier code (DIC). The DIC may be a three-digit code to categorize the supply/logistics records. The document identifier code provides means for identifying a transaction as to the system to which it pertains and further identifies such transaction as to its intended purpose and usage. The first position identifies the type of system, i.e., alphabetic character A has been assigned to the supply distribution system(s) for requisitioning and issue. For example, DIC A01 is a requisition transaction from the customer to the ICP, and a DIC AE1 indicates it is a supply status transaction from the ICP to the requisitioner. Accordingly, the merged file may be generated by copying only the corresponding actionable records that have a DIC of AE.

At block 240, the processing logic identifies action items from the merged file that match an item of the one or more files of the second database. The processing logic may compare an SDN of each record of the merged file with an SDN of each record of the one or more files of the second database. The records that match may then be written to an output file that includes each of the records that require an action be taken (i.e., action item) to reconcile the DASF information with the ULO information.

At block 250, the processing logic generates an output file with an action description to be performed on the first database to reconcile the first database with the second database. The processing logic may determine the quantity and unit price included in each record, if the record includes a quantity and unit price. The processing logic may calculate a total price and a possible adjustment to the records of the accounting information based on the status code for each record in the output file. For one embodiment, the processing logic may upload the output file to a user specified location and provide the output file to one or more specified users (e.g., via email).

Figure 3:
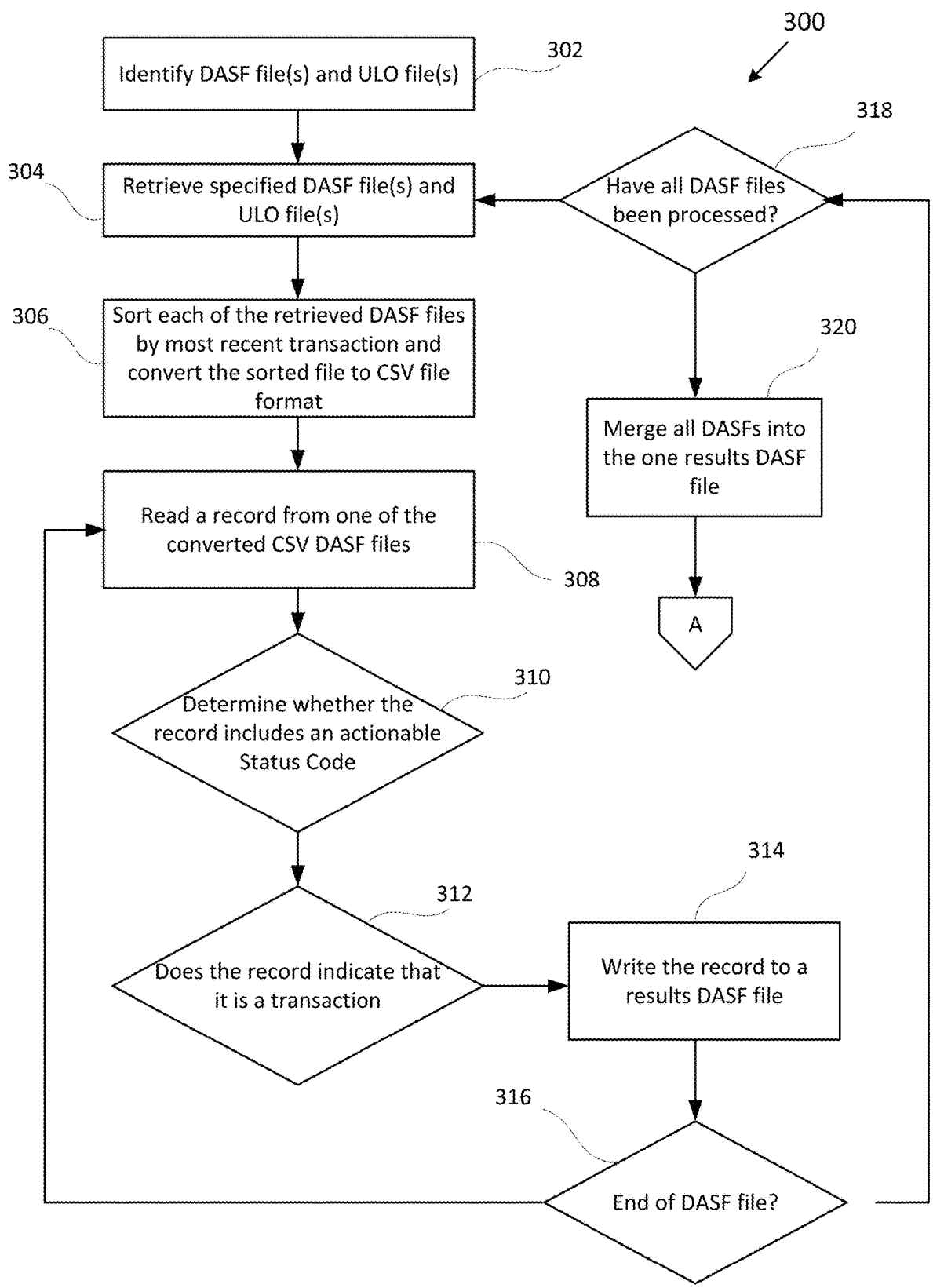
FIG. 3 is a flow diagram of another example method of data reconciliation between accounting and supply systems in accordance with some embodiments.

FIG. 3 is a flow diagram of a method 300 of virtual machine networking configuration migration, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by action item BOT 155 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 302, where the processing logic identifies one or more DASF file(s) and ULO file(s) to be reconciled. At block 304, the processing logic retrieves specified DASF files and ULO files. The processing logic may retrieve the files from a predetermined or specified location on the network, the accounting system, and logistics system. A user may provide the location of the files or the files may retrieve the files from a predetermined location on the network. The method 300 may begin in response to a user request to execute the processing logic. An error message or exception may be provided to a user if the files are not found. Any number of files may be retrieved from the accounting system and the logistics system. Although an accounting system and logistics system are described, the files may be retrieved from any type of database or other system.

For some embodiments, the DASF and the ULO files may be encrypted prior to retrieval. The processing logic may decrypt the files upon retrieval. In one embodiment, the files may be stored in a location only accessible by the processing logic (i.e., the action item BOT 155 of FIG. 1). For another embodiment, the action item BOT may include a password for retrieving the files. For example, the processing logic may crawl the systems for the identified data or files and generate the appropriate files to be ingested by the action item BOT.

At block 306, the processing logic sorts each of the retrieved DASF files by most recent transaction and convert the sorted file to CSV file format. At block 308, the processing logic reads a record from one of the converted CSV DASF files.

At block 310, the processing logic determines whether the record includes an actionable status code. For example, the record may determine whether the status code matches any one of a list of status codes and may either remove any records that do not include one of the status codes from the file or only copy to a results file the records that do match one of the list of actionable status codes. In other words, the processing logic may scrub the files to include only actionable status codes.

At block 312, in response to determining that the record includes an actionable status code, the processing logic determines whether the record is a transaction to the requisitioner from the supply system (i.e., an update to the status of transaction). At block 314, in response to determining that the transaction is between the appropriate entities, the processing logic writes the record to a results DASF file.

At block 316, the processing logic determines whether the end of the DASF file has been reached. At block 318, if the end of the file has been reached, the processing logic determines whether all DASF files have been processed. At block 320, if all DASF files have been processed, the processing logic merges all DASFs into a results DASF file. At this point, the results DASF file may still include just DASF data from the previous files. The processing logic may then continue to method 400, as described in FIG. 4 below.

Figure 4:
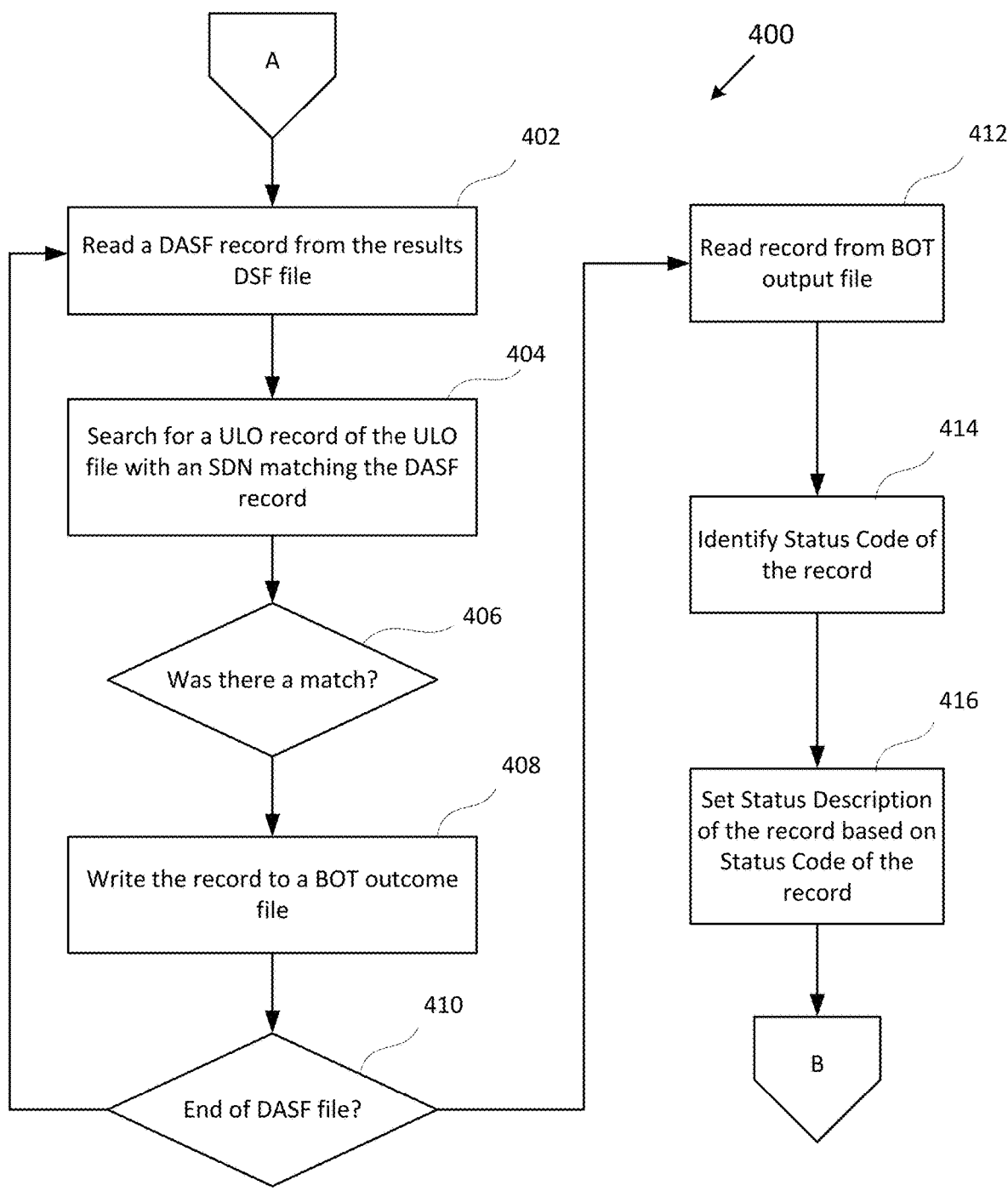
FIG. 4 is a flow diagram of another example method of data reconciliation between accounting and supply systems in accordance with some embodiments.

FIG. 4 is a flow diagram of a method 400 of virtual machine networking configuration migration, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For some embodiments, at least a portion of method 400 may be performed by action item BOT 155 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 402, after block 316 of method 300 above, where the processing logic reads a DASF record from the results DSF file. At block 404, the processing logic searches for a ULO record of the ULO file with an SDN matching the SDN of the DASF record. The SDN may provide a common reference number of a transaction across several systems such that information associated with the transaction may be identified and retrieved from any system. For example, any documentation associated with the transaction may include the same SDN. At block 406, the processing logic determines whether there was a matching SDN in the ULO file. The matching SDN indicates that the same transaction is referenced in each of the results DASF file and the ULO file.

At block 408, if there was an SDN match in the ULO file, the processing logic writes the record from each of the results DASF file and the ULO file to a BOT outcome file. In other words, the record data for the transaction from the DASF file and the record data for the transaction from the ULO file are written to the BOT outcome file. At block 410, the processing logic determines whether the end of the DASF file has been reached.

At block 412, in response to the end of the DASF file being reached, the processing logic reads each record from the BOT output file. At block 414, the processing logic identifies a status code of the record. At block 416, the processing logic sets the status description of the record based on status code of the record. For example, for a status code 137' the processing logic may set the status description to 'price change'; for status code 'Bf' the status description may be set to 'no record of requisition'; for status code 'BG' the status description may be set to 'unit failed to respond to MOV.' A status description may be set for any status code, the status description to describe the meaning the status code in laymen's terms (i.e., language that is simple to understand). The processing logic may then continue to method 500 as described in FIG. 5 below.

Figure 5:
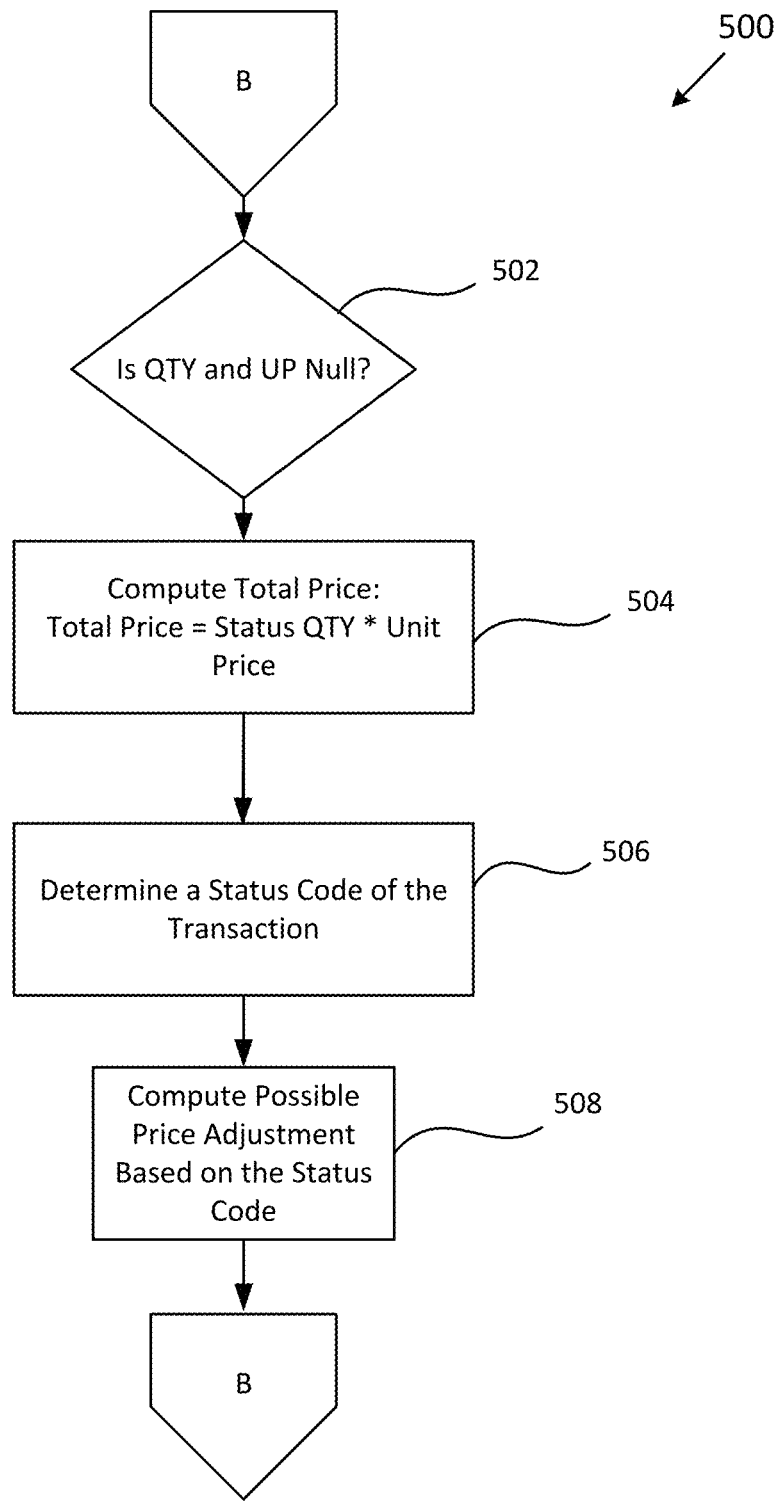
FIG. 5 is a flow diagram of another example method of data reconciliation between accounting and supply systems in accordance with some embodiments.

FIG. 5 is a flow diagram of a method 500 of virtual machine networking configuration migration, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by action item BOT 155 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. The blocks in method 500 may be performed in an order different than presented, and that not all of the blocks in method 500 may be performed.

Method 500 begins at block 502, where the processing logic determines whether the quantity (QTY) and the unit price (UP) are null. If the QTY or UP are null, then no adjustment to prices is to be provided. At block 504, if the QTY and UP are not null, the processing logic computes the total price of the associated record by multiplying the status QTY and the UP. The total price of the transaction may also be referred to herein as the extended price of the transaction. The total price, or extended price, may be the total cost of the transaction or requisition.

At block 506, the processing logic determines the status code of the transaction. For example, the processing logic may determine whether the status code indicates that a transaction has been cancelled, is in error, or otherwise not fillable (e.g., status code 'BF', 'C8', 'CA', 'CB', 'CD', 'CG', 'CH', 'CJ', 'CK', 'CM', 'CP', 'CQ', 'CU', 'CX', or 'CY'). At block 508, the processing logic may compute a possible price adjustment based on the status code of the transaction. For example, in response to the status code indicating a cancellation of the transaction, the processing logic calculates an adjustment to remove the unliquidated order amount. The processing logic may also determine whether the status code indicates that a unit price has changes (e.g., status code 'B7'). In response to determining that the unit price has changed, the processing logic calculates a possible adjustment by subtracting the ULO amount from the previously calculated extended price. The processing logic may determine whether a quantity or unit is in error or has been changed (e.g., status codes 'CS' or 'BG'). The processing logic may then set the possible adjustment to indicate that further research is required by the supply or fiscal departments. The processing logic may determine whether the status code indicates that the transaction is cancelled due to requisitioning activity failing to respond to the MOV request from the processing point (e.g., status code 'BS'). The processing logic may then set the possible adjustment to indicate that supply is to validate the requisition with the source of supply. The processing logic may then continue to method 600 after the possible adjustment is set.

Figure 6:
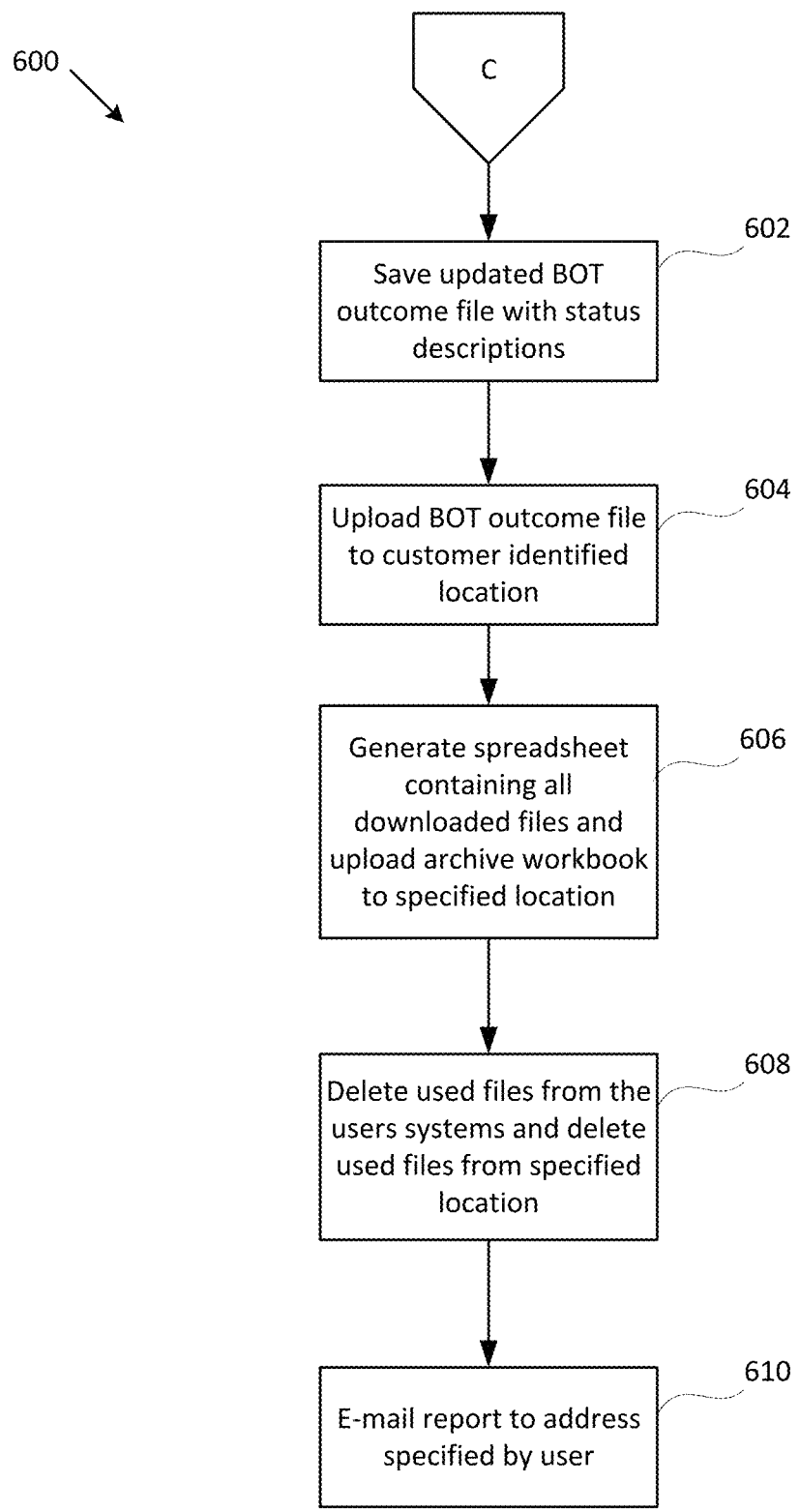
FIG. 6 is a flow diagram of another example method of data reconciliation between accounting and supply systems in accordance with some embodiments.

FIG. 6 is a flow diagram of a method 600 of virtual machine networking configuration migration, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For some embodiments, at least a portion of method 600 may be performed by action item BOT 155 of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. The blocks in method 600 may be performed in an order different than presented, and that not all of the blocks in method 600 may be performed.

Method 600 begins at block 602, where the processing logic saves the updated BOT outcome file with status descriptions. At block 604, the processing logic uploads the BOT outcome file to customer identified location. At block 606, the processing logic generates a spreadsheet containing all downloaded files and uploads the archive workbook to a specified location. At block 608, the processing logic deletes used files from the user systems and deletes used files from specified locations. At block 610, the processing logic emails a report to one or more email addresses specified by the user. The report comprising action items for reconciliation of the accounting system with the logistics/supply system. For one embodiment, the processing logic may identify one or more users to which the report is to be mailed. For one example, the entire report is provided to each of the specified users. For another example, the processing logic may parse the report to generate several portions of the report each to be provided to a particular user to which the portion of the report is relevant. Accordingly, the information in the report may be provided to users on a need to know basis so appropriate action may be taken.

For an alternative embodiment, the action items provided by the processing logic may be performed directly by the processing logic. For example, the processing logic may directly perform the action items on the accounting system. The method is not limited to an accounting system and the preceding methods may be performed to reconcile data between any two systems. For example, in a human resources system there may be information between two systems that require reconciliation. The proceeding methods may be performed between such systems. The source code may be written in any computing language, such as UiPATH, C++, .NET, etc. and executed on any computing platform.

Figure 7:
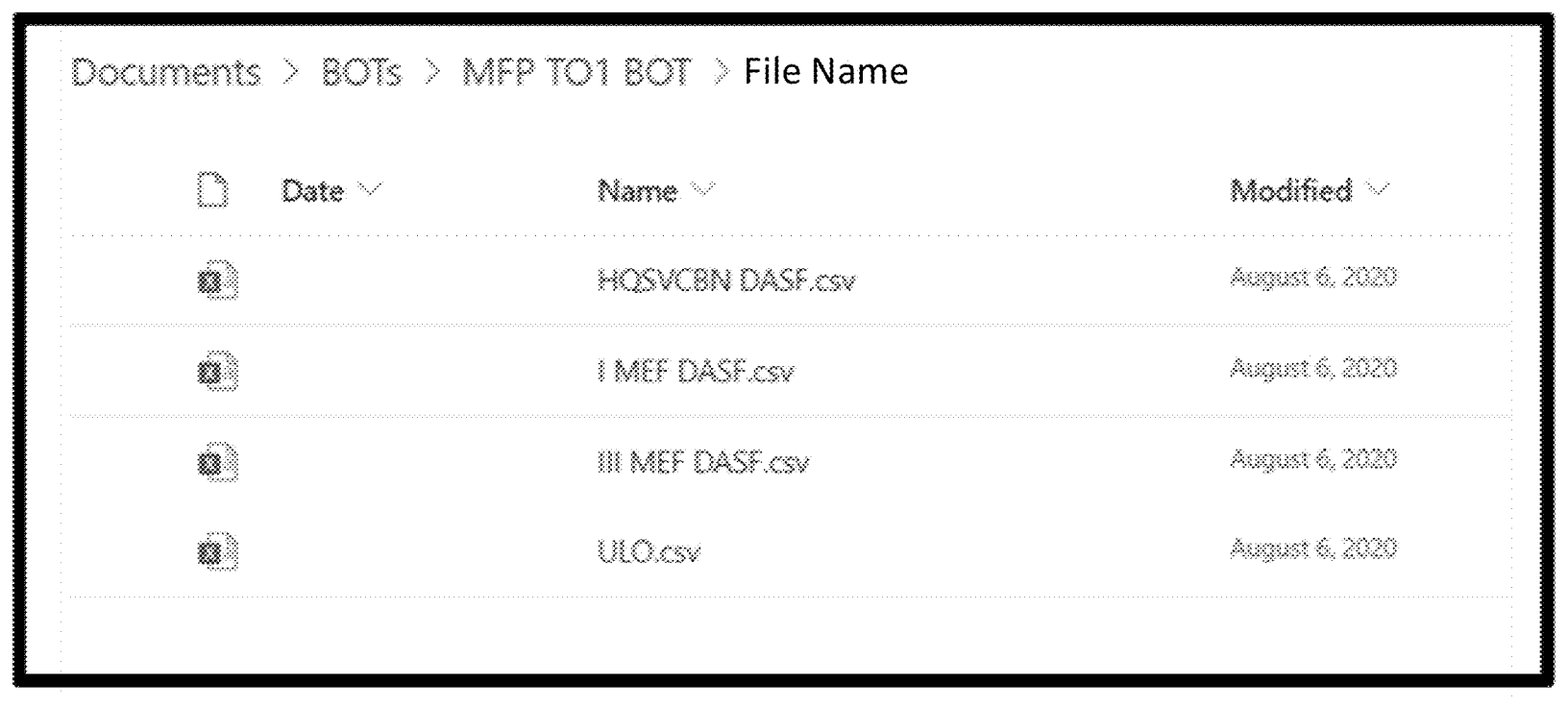
Figure 8A:
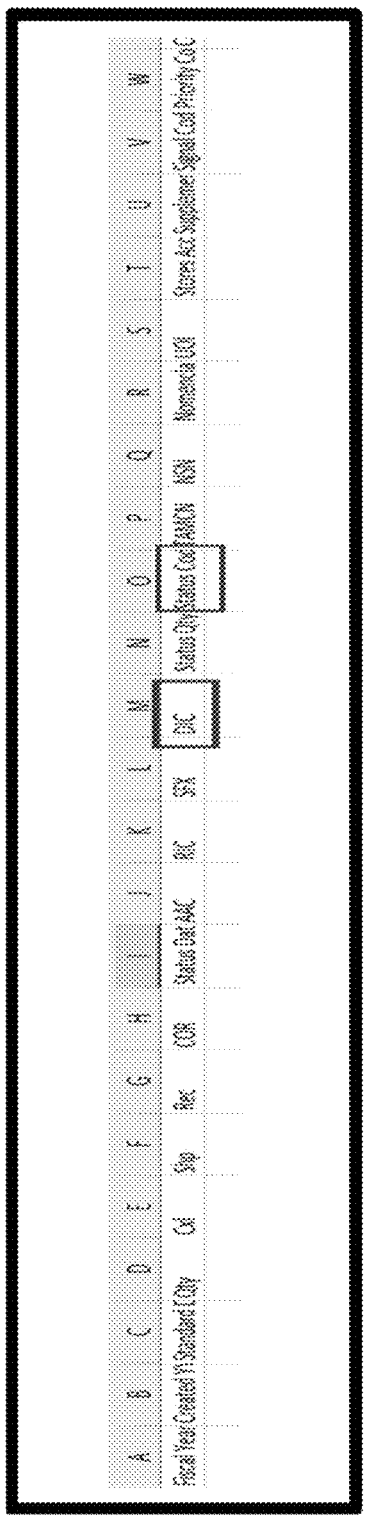
FIG. 8A is a diagram illustrating an example accounting system file structure according to some embodiments.
Figure 8B:
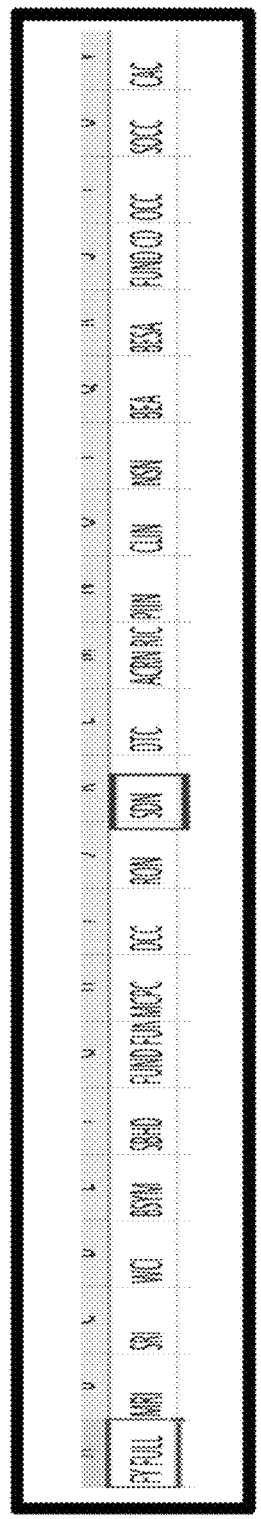
FIG. 8B is a diagram illustrating an example supply system file structure according to some embodiments.
Figure 8C:
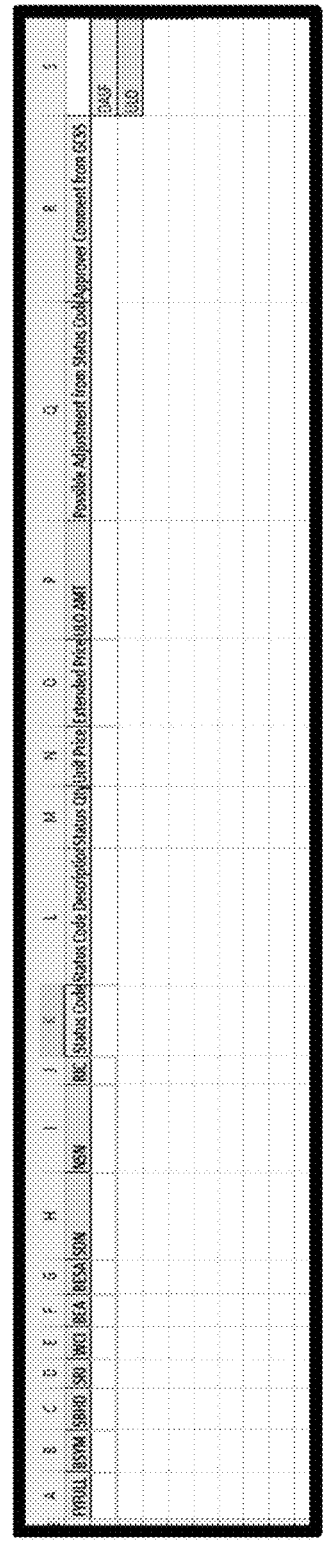
FIG. 8C is a diagram illustrating an example output file structure according to some embodiments.

FIG. 7 depicts an example interface 700 for input of DASF files and ULO files to an action item BOT. For example, as depicted, the BOT may receive an input of three DASF files, each comprising different types of DASF records. The DASF file may include several fields for each record, as depicted in FIG. 8A, include a DIC field and a status code. Additionally, the BOT may receive an ULO file. The ULO file may include an SDN field for each of the records. As described above, with respect to FIGS. 2-6, the BOT may consolidate the records of the DASF files into a resulting record comprised of action items from the original input DASF files. The BOT may then identify records in the ULO file with a matching SDN. The matching records may then be written to a BOT output file. Finally, an action description can be added to the records based on the associated status code. The final BOT output file is illustrated by FIG. 8C. The final BOT output file may then be stored, uploaded, and/or provided to one or more users (e.g., via email.)

Figure 9:
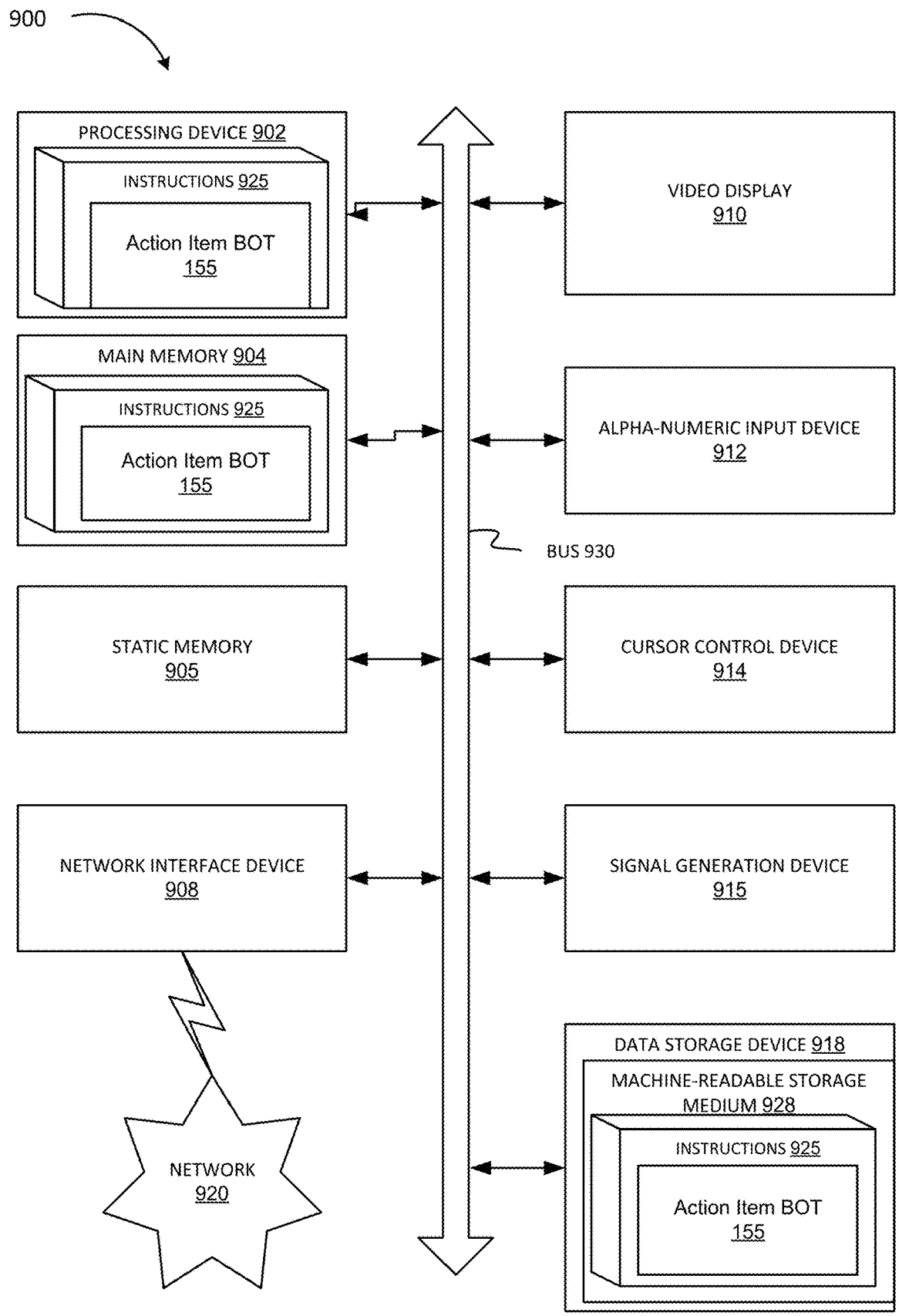
FIG. 9 is a block diagram of an example apparatus that may perform one or more of the operations described herein, in accordance with some embodiments of the present disclosure.

FIG. 9 is a block diagram of an example computing device 900 that may perform one or more of the operations described herein, in accordance with some embodiments. Computing device 900 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general purpose processor, a PLD, etc.) 902, a main memory 904 (e.g., synchronous dynamic random access memory (DRAM), read-only memory (ROM)), a static memory 906 (e.g., flash memory and a data storage device 918), which may communicate with each other via a bus 930.

Processing device 902 may be provided by one or more general-purpose processing devices such as a microprocessor, central processing unit, or the like. In an illustrative example, processing device 902 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also comprise one or more special-purpose processing devices such as an application specific integrated circuit (ASIC), a field programmable gate array (FPGA), a digital signal processor (DSP), network processor, or the like. The processing device 902 may be configured to execute the operations described herein, in accordance with one or more aspects of the present disclosure, for performing the operations and steps discussed herein.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Data storage device 918 may include a computer-readable storage medium 928 on which may be stored one or more sets of instructions 925 that may include instructions for a networking migration controller, e.g., action item BOT 155, for carrying out the operations described herein, in accordance with one or more aspects of the present disclosure. Instructions 925 may also reside, completely or at least partially, within main memory 904 and/or within processing device 902 during execution thereof by computing device 900, main memory 904 and processing device 902 also constituting computer-readable media. The instructions 925 may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein.

What is claimed is:

1. A method comprising:
   retrieving a plurality of files associated with a first database, wherein the plurality of files associated with the first database comprise a plurality of DASF (due and status file) files;
   retrieving one or more files associated with a second database;

merging and filtering, by a processing device, the plurality of files of the first database into a merged file comprising action items from the plurality of files;

identifying, by the processing device, action items from the merged file that match an item of the one or more files of the second database; and generating, by the processing device, an output file comprising an action description to be performed on the first database to reconcile the first database with the second database.

2. The method of claim 1, wherein the one or more files associated with the second database comprise one or more ULO (unliquidated order) files.

3. The method of claim 1, wherein merging and filtering the plurality of files of the first database comprises:

determining whether each record and plurality of files comprises an actionable status code; and writing the records that comprise an actionable status code to the merged file.

4. The method of claim 1, wherein identifying action items from the merged file that match an item of the one or more files of the second database comprises:

comparing an SDN (standard document number) of each record of the merged file with an SDN of each record of the one or more files of the second database; and writing each of the records that have a matching SDN to the output file.

5. The method of claim 1, wherein generating the output file comprises:

determining a status code associated with each record of the output file; and generating a status description for the record based on the status code.

6. The method of claim 5, wherein generating the output file further comprises:

determining whether a quantity and unit price are included in each record; and calculating, for each record that includes a quantity and a unit price, a total price and a possible adjustment based on the status code associated with each record.

7. The method of claim 1, further comprising:

uploading the output file to a user specified location; and
providing the output file to one or more specified users.

8. A system comprising:

a memory; and a processing device operatively coupled to the memory, the processing device to:

retrieve a plurality of files associated with a first database, wherein the plurality of files associated with the first database comprise a plurality of DASF (due and status file) files;

retrieve one or more files associated with a second database;

merge and filter the plurality of files of the first database into a merged file comprising action items from the plurality of files;

identify action items from the merged file that match an item of the one or more files of the second database; and generate an output file comprising an action description to be performed on the first database to reconcile the first database with the second database.

9. The system of claim 8, wherein the one or more files associated with the second database comprise one or more ULO (unliquidated order) files.

10. The system of claim 8, wherein to merge and filter the plurality of files of the first database, the processing device is to:

determine whether each record and plurality of files comprises an actionable status code; and write the records that comprise an actionable status code to the merged file.

11. The system of claim 8, wherein to identify action items from the merged file that match an item of the one or more files of the second database the processing device is to:

compare an SDN (standard document number) of each record of the merged file with an SDN of each record of the one or more files of the second database; and write each of the records that have a matching SDN to the output file.

12. The system of claim 8, wherein to generate the output file, the processing device is to:

determine a status code associated with each record of the output file; and generate a status description for the record based on the status code.

13. The system of claim 12, wherein to generate the output file, the processing device is further to:

determine whether a quantity and unit price are included in each record; and calculate, for each record that includes a quantity and a unit price, a total price and a possible adjustment based on the status code associated with each record.

14. The system of claim 8, wherein the processing device is to:

upload the output file to a user specified location; and
provide the output file to one or more specified users.

15. A non-transitory computer-readable storage medium including instructions that, when executed by a processing device, cause the processing device to:

retrieve a plurality of files associated with a first database, wherein the plurality of files associated with the first database comprise a plurality of DASF (due and status file) files;

retrieve one or more files associated with a second database;

merge and filter, by the processing device, the plurality of files of the first database into a merged file comprising action items from the plurality of files;

identify, by the processing device, action items from the merged file that match an item of the one or more files of the second database; and generate, by the processing device, an output file comprising an action description to be performed on the first database to reconcile the first database with the second database.

16. The non-transitory computer-readable storage medium of claim 15, wherein to merge and filter the plurality of files of the first database, the processing device is to:

determine whether each record and plurality of files comprises an actionable status code; and write the records that comprise an actionable status code to the merged file.

17. The non-transitory computer-readable storage medium of claim 15, wherein to identify action items from the merged file that match an item of the one or more files of the second database the processing device is to:

compare an identifier of each record of the merged file with an identifier of each record of the one or more files of the second database; and write each of the records that have a matching identifier to the output file.

18. The non-transitory computer-readable storage medium of claim 15, wherein to generate the output file the processing device is to:
    determine a status code associated with each record of the output file; and
    generate a status description for the record based on the status code.

\* \* \* \* \*